(12) United States Patent
Baxter

(10) Patent No.: US 10,247,505 B1
(45) Date of Patent: Apr. 2, 2019

(54) TRIGGER PULL TRAINING DEVICE

(71) Applicant: TriggerMaster, Inc., Nolensville, TN (US)

(72) Inventor: Malcom Baxter, Nolensville, TN (US)

(73) Assignee: TRIGGERMASTER, LLC, West Palm Beach, FL (US)

( * ) Notice: Subject to any disclaimer, the term of this patent is extended or adjusted under 35 U.S.C. 154(b) by 0 days.

(21) Appl. No.: 14/875,393

(22) Filed: Oct. 5, 2015

Related U.S. Application Data

(63) Continuation of application No. 12/908,420, filed on Oct. 20, 2010, now Pat. No. 9,151,564, which is a
(Continued)

(51) Int. Cl.
*F41A 33/02* (2006.01)
*F41A 33/00* (2006.01)
(Continued)

(52) U.S. Cl.
CPC ............. *F41A 33/00* (2013.01); *F41A 19/10* (2013.01); *A63F 2300/8076* (2013.01);
(Continued)

(58) Field of Classification Search
CPC .......... F41A 33/02; F41A 19/10; F41A 33/06; F41A 17/46; F41A 19/16; F41A 17/00;
(Continued)

(56) References Cited

U.S. PATENT DOCUMENTS 1,786,614 A 12/1930 Howard
2,077,373 A 4/1937 Formhals
(Continued)

OTHER PUBLICATIONS

The Encyclopedia of Bullseye Pistol, Trigger Control, Chapter 3: Army Marksmanship Training Guide, http://www.bullseyepistol.com/chapter3.htm, 8 pages, Feb. 23, 2005.

*Primary Examiner* — Jack Yip
(74) *Attorney, Agent, or Firm* — Pillsbury Winthrop Shaw Pittman, LLP

(57) ABSTRACT

A firearm system for monitoring the displacement of a firearm trigger during a trigger pull includes a firearm body including a handle and a barrel attached to the handle. A trigger is attached to the firearm body, and a position input circuit is attached to the trigger. The position input circuit emits a trigger position signal including information representative of the trigger displacement. The firearm body is in wired or wireless communication with an electronic device. The electronic device can include a monitor, or screen, for graphically displaying a trigger position indicator representative of the displacement of the trigger along one or more axes. The firearm body can include a motion sensing circuit generally adapted to detect motion of the firearm body. The motion sensing circuit can include one or more accelerometers or gyroscopes. A wireless transmitter or transceiver can be positioned on the firearm body for communicating trigger displacement information and/or firearm body motion information to the electronic device. Methods of providing firearm user input information to a firearm user are also provided.

19 Claims, 11 Drawing Sheets

Related U.S. Application Data continuation-in-part of application No. 11/504,313, filed on Aug. 15, 2006, now Pat. No. 8,556,628.

(51) Int. Cl.

| | |
|---|---|
| *F41A 19/10* | (2006.01) |
| *F41J 5/02* | (2006.01) |
| *F41G 3/26* | (2006.01) |
| *F41J 5/08* | (2006.01) |
| *F41B 11/57* | (2013.01) |
| *F41G 1/38* | (2006.01) |

(52) U.S. Cl.
CPC ............. *F41B 11/57* (2013.01); *F41G 1/38* (2013.01); *F41G 3/2605* (2013.01); *F41G 3/2655* (2013.01); *F41J 5/02* (2013.01); *F41J 5/08* (2013.01)

(58) Field of Classification Search
CPC ........ F41G 3/2655; F41G 1/38; F41G 3/2605; F41J 5/02; F41J 5/08; A63F 2300/8076; F41B 11/57; G05G 9/047; G09B 19/0038
USPC .................................. 434/11, 16, 19
See application file for complete search history.

(56) References Cited

U.S. PATENT DOCUMENTS

| | | | |
|---|---|---|---|
| 2,325,599 A | 8/1943 | Fidelman | |
| 2,396,017 A | 3/1946 | Martin | |
| 2,559,010 A | 7/1951 | Cutler | |
| 3,365,975 A | 1/1968 | Hathaway | |
| 3,861,069 A | 1/1975 | Heurlen | |
| 4,725,235 A | 2/1988 | Schroeder et al. | |
| 4,725,978 A | 2/1988 | Fujioka | |
| 4,782,336 A | 11/1988 | Bailey | |
| 4,913,655 A | 4/1990 | Pinkley et al. | |
| 5,316,479 A | 5/1994 | Wong et al. | |
| 5,345,214 A | 9/1994 | Tsui | |
| 5,453,758 A | 9/1995 | Sato | |
| 5,532,476 A | 7/1996 | Mikan | |
| 5,658,238 A | 8/1997 | Suzuki et al. | |
| 5,761,954 A | 6/1998 | Dvorak | |
| 5,831,596 A | 11/1998 | Marshall et al. | |
| 5,847,694 A | 12/1998 | Redford et al. | |
| 5,954,507 A | 9/1999 | Rod et al. | |
| 6,144,367 A | 11/2000 | Berstis | |
| 6,181,327 B1 | 1/2001 | Lin et al. | |
| 6,243,077 B1 | 6/2001 | Manara et al. | |
| 6,257,893 B1 | 7/2001 | Trabut | |
| 6,545,661 B1 | 4/2003 | Goschy | |
| 6,672,962 B1 | 1/2004 | Ozaki et al. | |
| 6,739,873 B1 | 5/2004 | Rod et al. | |
| 6,775,940 B2 * | 8/2004 | Dworzan | F41A 17/06 42/1.01 |
| 6,854,975 B2 | 2/2005 | Ranzinger | |
| 7,329,127 B2 | 2/2008 | Kendir et al. | |
| 7,587,277 B1 | 9/2009 | Wells | |
| 7,774,155 B2 | 8/2010 | Sato et al. | |
| 7,813,581 B1 | 10/2010 | Fitzpatrick | |
| 8,275,544 B1 | 9/2012 | Wells et al. | |
| 8,556,628 B1 | 10/2013 | Baxter | |
| 2002/0162193 A1 | 11/2002 | Frys | |
| 2002/0171625 A1 | 11/2002 | Rothchild | |
| 2002/0174588 A1 | 11/2002 | Danner et al. | |
| 2002/0186204 A1 | 12/2002 | Kim | |
| 2002/0197584 A1 | 12/2002 | Kendir et al. | |
| 2003/0022716 A1 | 1/2003 | Park et al. | |
| 2003/0189547 A1 | 10/2003 | Lee et al. | |
| 2003/0221684 A1 | 12/2003 | Rice | |
| 2005/0014113 A1 | 1/2005 | Fleck et al. | |
| 2005/0021282 A1 | 1/2005 | Sammut et al. | |
| 2005/0197178 A1 | 9/2005 | Villegas | |
| 2006/0005447 A1 * | 1/2006 | Lenner | F41G 3/06 42/111 |
| 2007/0190495 A1 * | 8/2007 | Kendir | F41A 33/02 434/21 |
| 2008/0105050 A1 | 5/2008 | Kraetz | |
| 2009/0005166 A1 * | 1/2009 | Sato | A63F 13/06 463/37 |
| 2009/0233768 A1 | 9/2009 | Merzenich et al. | |
| 2009/0262074 A1 | 10/2009 | Nasiri et al. | |
| 2010/0221685 A1 * | 9/2010 | Carter | F41A 33/00 434/19 |
| 2011/0118023 A1 | 5/2011 | Fu | |
| 2011/0167691 A1 | 7/2011 | Bowman et al. | |
| 2012/0330182 A1 | 12/2012 | Alberts et al. | |
| 2014/0360081 A1 | 12/2014 | Lupher et al. | |
| 2016/0033221 A1 | 2/2016 | Schmehl et al. | |

\* cited by examiner

TRIGGER PULL TRAINING DEVICE

CROSS REFERENCES TO RELATED APPLICATIONS

This application is a continuation of co-pending U.S. patent application Ser. No. 12/908,420 filed Oct. 20, 2010, entitled "Firearm Trigger Pull Training System and Methods"; which is a continuation-in-part of U.S. Pat. No. 8,556,628, issued Oct. 15, 2013, entitled "Shooting Training Device," all of which are hereby incorporated by reference in their entireties.

BACKGROUND

The present invention relates to firearms and more particularly to devices, systems and methods for use with a firearm or a firearm replica for graphically indicating information to a user during or after live or practice firing.

A firearm operator typically provides at least two types of input when operating a firearm. First, the operator generally aims the firearm at a target. Second, the operator typically pulls the firearm trigger using a single finger of the user's hand, thereby activating a firing mechanism in the firearm to discharge one or more projectiles from the firearm barrel toward the target.

Generally, during the pull of a firearm trigger, the operator applies a pulling force against the trigger in at least two dimensions. First, when the trigger is pulled, a force is applied along a longitudinal trigger axis generally parallel to the axis of the barrel. The longitudinal force application causes the trigger to move longitudinally toward the operator's hand. When the trigger has reached a predetermined longitudinal position, the firing mechanism in the firearm is activated and a shot is fired, causing one or more projectiles to be discharged from the firearm.

The second direction of force application against the trigger by the user's hand can occur along a lateral axis oriented substantially perpendicular to the longitudinal axis. Typically, the application of lateral force against the trigger can cause the firearm barrel to move laterally off the desired target in any direction. Such barrel movement is undesirable and causes inaccuracy of the fired shot.

Similarly, a firearm operator may inadvertently apply force against the trigger using the operator's finger in a third, generally vertical, direction during a trigger pull, causing the firearm barrel to move up or down relative to the desired target.

Others have attempted monitor the lateral force application and/or lateral movement of the trigger during a trigger pull to indicate to the user whether the trigger is being pulled along a true longitudinal path, or whether the trigger is being pulled laterally and vertically. Improvements upon such conventional systems and techniques are needed in the art.

BRIEF SUMMARY

One aspect of the present invention provides a firearm system for graphically indicating to a user a displacement path of a trigger. The firearm system includes a firearm body including a handle and a barrel extending away from the handle. The barrel defines a longitudinal barrel axis. A firearm trigger is disposed on the firearm body. The firearm trigger is shaped for engagement by a single finger of a user's hand when the user's hand is positioned on the handle. A position input circuit is disposed on the firearm body and includes a multi-axis position controller mechanically attached to the trigger.

Yet another aspect of the present invention provides a firearm system for detecting and graphically displaying to a user a trigger pull path. The system includes a firearm body including a barrel defining a longitudinal barrel axis. The firearm body includes a handle adapted for being gripped by the user's hand. A position input circuit is disposed on the firearm body. The position input circuit includes a position controller having a post extending therefrom. The post is moveable along the longitudinal barrel axis. The post is also moveable along at least one additional axis oriented substantially perpendicular to the longitudinal barrel axis. A microcontroller is operatively connected to the position controller.

A further aspect of the present invention provides a method of providing firearm user input information, the method includes the steps of: (a) providing a firearm body including a firearm trigger and a position input circuit including a multi-axis position controller, the firearm trigger being attached to the multi-axis position controller; (b) pulling the trigger; (c) sensing displacement of the trigger along at least two axes; (d) communicating trigger displacement information to an electronic device having a monitor; (e) displaying on the monitor of the electronic device a graphical trigger position indicator representative of the trigger displacement along at least two axes.

DETAILED DESCRIPTION

Figure 1:
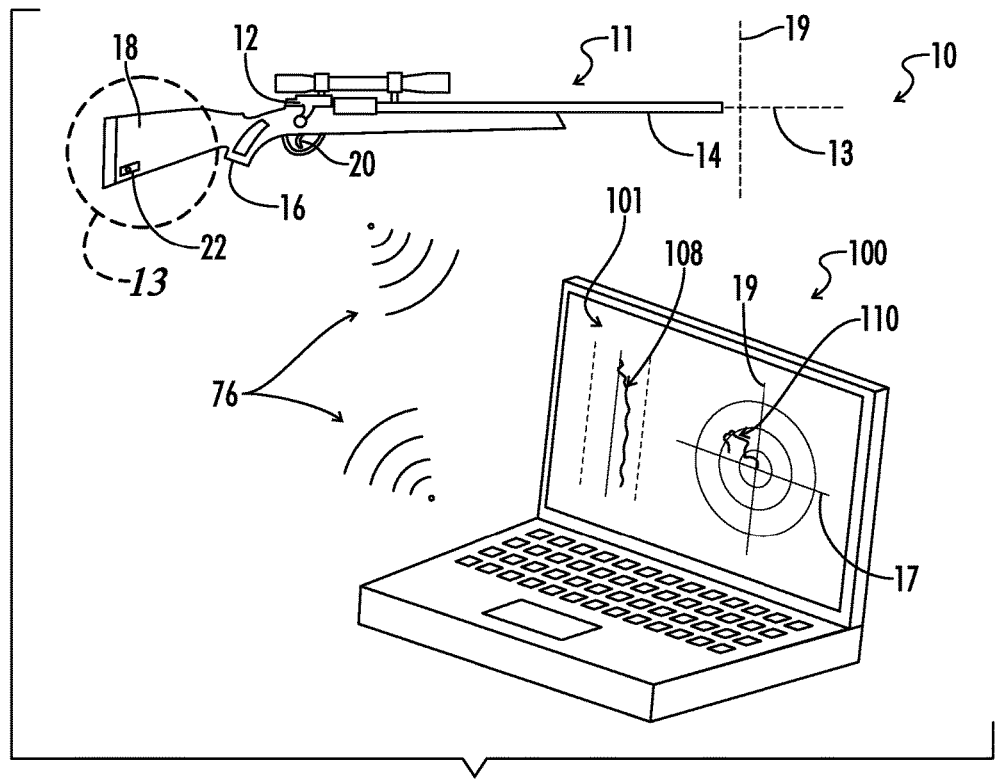
FIG. 1 illustrates a perspective view of an embodiment of a firearm system including a firearm body in the form of a rifle and an electronic device in wireless communication with the firearm body.

Referring now to the drawings, FIG. 1 illustrates a perspective view of an embodiment of a firearm apparatus generally designated by the numeral 10. In the drawings, not all reference numbers are included in each drawing for the sake of clarity. In addition, positional terms such as "upper," "lower," "side," "top," "bottom," etc. refer to the apparatus when in the orientation shown in the drawing. The skilled artisan will recognize that the apparatus can assume different orientations when in use.

The firearm system 10 of the present invention generally provides a user the ability to graphically monitor user input to the firearm during or after a live or simulated trigger pull. A trigger pull generally includes the act of depressing, or pulling, the trigger using one or more fingers of the firearm user's hand. In some embodiments, the firearm apparatus 10 allows a firearm user to monitor both the lateral and the longitudinal displacement of the firearm trigger 20 during or after a trigger pull. Such information is important to a firearm user for training purposes or for shot analysis. When a firearm trigger is pulled directly back only along a longitudinal axis, a fired shot actuated by that trigger pull is more likely to be on target. However, when a trigger pull includes a lateral displacement component, the firearm barrel can move during the trigger pull, thereby causing the shot to move off the desired target. By measuring the path of the trigger in at least two dimensions, a firearm user can improve the trigger pull technique to improve accuracy.

Additionally, in some applications, a firearm user can use firearm system 10 of the present invention to graphically monitor barrel displacement associated with the trigger pull. For example, a trigger pull that includes more than one displacement component vector, i.e. a trigger pull having at least a two dimensional trigger pull path, can cause the firearm barrel to inadvertently move during the trigger pull. Such movement can be detected and graphically monitored by the user of firearm system 10 in some embodiments.

Thus, firearm system 10 of the present invention can be used to monitor trigger displacement only, monitor barrel displacement only, or monitor both trigger displacement, i.e. trigger pull path, and barrel displacement. In some applications, firearm system 10 can be used as a training tool during dry firing of a firearm or firearm replica to train a user to improve trigger pull technique. In other applications, the firearm system 10 of the present invention can be used to monitor and/or store data associated with the trigger pull path and/or associated barrel displacement data during live firing such as firing during target practice, product testing, hunting, recreational or competitive shooting, and combat.

Referring further to FIG. 1, an embodiment of a firearm system 10 includes a firearm body 11. Firearm body 11 in some embodiments includes a firearm such as a pistol, a rifle or a shotgun. In other embodiments, the firearm body 11 can include a replica of a pistol, rifle, shotgun or other type of firearm known in the art. In FIG. 1, one embodiment of a firearm body 11 including a rifle is generally illustrated. Firearm body 11 generally includes a handle 16 and a barrel 14 extending from the handle 16. Barrel 14 defines a longitudinal barrel axis 15 substantially aligned with the bore of barrel 14. Barrel 14 includes a hollow region in some embodiments and is adapted for ejecting one or more projectiles. A firearm trigger 20 is positioned on firearm body 11. Firearm trigger 20 is configured for engagement by a single finger of a user's hand when the user's hand is positioned on handle 16. In the embodiment illustrated in FIG. 1, firearm body 11 also includes a shoulder stock 18.

As seen in FIG. 1, an electronic device 100 is in communication with firearm body 11 in some embodiments. Electronic device 100 can include any type of electronic device known in the art for graphically displaying information or for storing information. Electronic device 100 in some embodiments includes a portable electronic device such as a laptop notebook computer or a tablet computer such as an Apple iPad or a Blackberry Playbook. In some embodiments, electronic device 100 can be a desktop computer or other fixed electronic device. In further embodiments, electronic device 100 can be a mobile cellular handset, i.e. a cellular telephone such as an iPhone manufactured by Apple Inc. of Cupertino, Calif. or various other models of cellular telephones manufactured by various other manufacturers including Samsung, Blackberry, Nokia, etc. In additional embodiments, electronic device 100 can include a personal data assistant (PDA) or a television.

Electronic device 100 typically includes a screen 101. The screen 101 can be a backlit screen such as a television or computer screen, an LED or LCD screen or other types of display screens known in the art. As seen in FIG. 1, electronic device 100 can communicate with firearm body 11 using a wireless communication signal 76 in some embodiments. In other embodiments, electronic device 100 can communicate with firearm body 11 using a wired connection.

Figure 2:
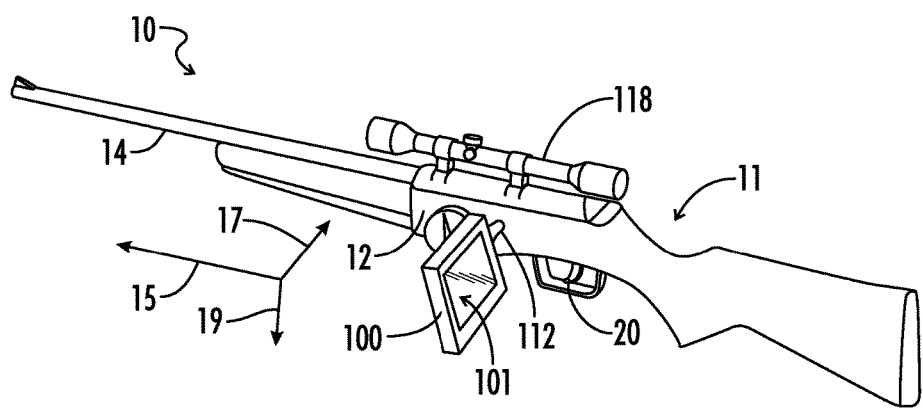
FIG. 2 illustrates a perspective view of one embodiment of a firearm system including a firearm body and an electronic device having a display screen attached to the firearm body.

Referring now to FIG. 2, in some embodiments, the electronic device 100 is attached to the firearm body 11. Electronic device 100 includes a screen 101 generally facing away from the barrel 14 positioned for viewing by a user of the firearm. Electronic device 100 is pivotally attached to firearm body 11 at a pivoting joint 112. Electronic device 100 can be rotated, or pivoted, about pivoting joint 112 for adjusting the angular position of electronic device 100 relative to firearm body 11. Electronic device 100 is illustrated in FIG. 2 generally in an open position. One or more wires can extend between electronic device 100 and firearm body 11 in this embodiment.

In some embodiments, a scope 118 is attached to receiver 12, as seen in FIG. 2. Scope 118 can include a viewing port and a screen generally adapted to display trigger pull information. Scope 118 in some embodiments includes one or more lenses transparent to visible wavelengths of light. An operator of firearm body 11 can look through scope 118 toward the desired target. In some embodiments, scope 118 includes a graphical display screen adapted to display user input information. By observing the screen housed in scope 118, a user can maintain visual contact with the target through the scope lens during the trigger pull.

Referring further to FIG. 2, three coordinate axes are generally defined relative to firearm body 11. First, a longitudinal axis 15 is generally oriented parallel to the barrel 14, and can be described as longitudinal barrel axis 15, a primary axis, or a first axis. A second axis 17 is generally oriented perpendicular to the first axis 15. Second axis 17 can be described as a lateral axis 17 in some embodiments. A third axis 19 is generally oriented perpendicular to both first axis 15 and second axis 17. Third axis 19 can be described as a vertical axis in some embodiments.

Figure 16:
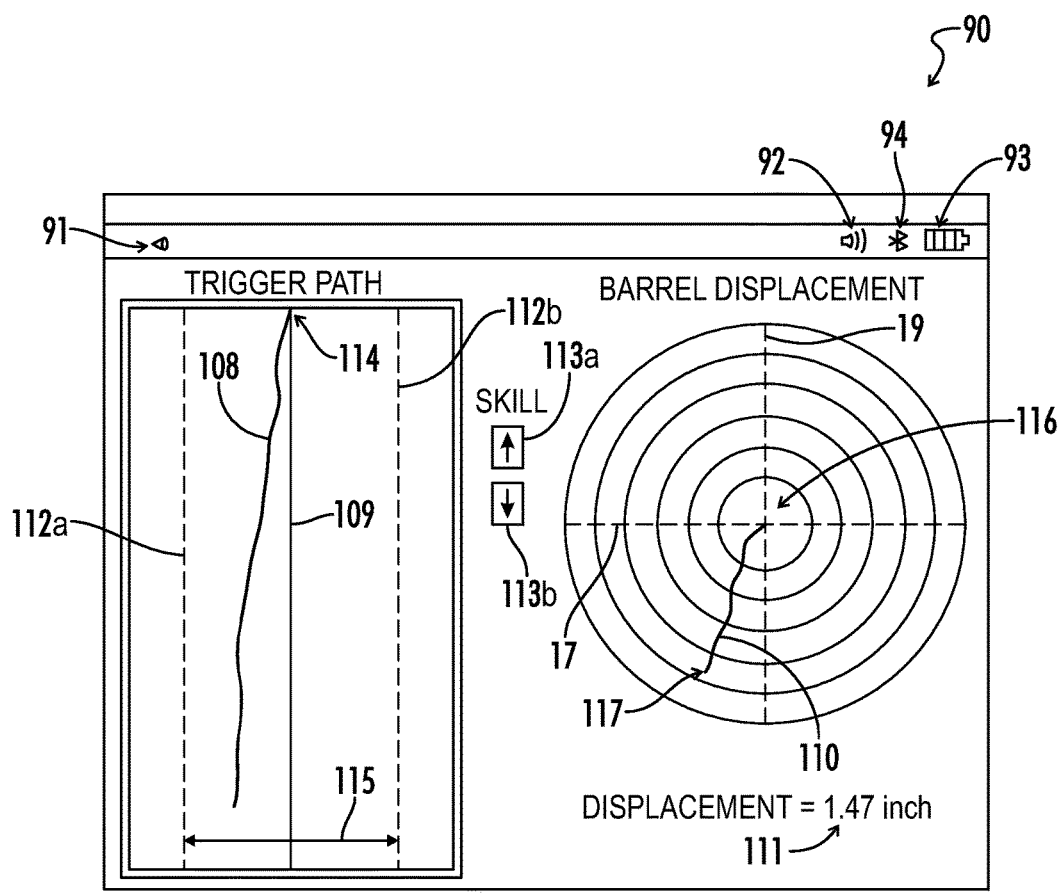
FIG. 16 illustrates an embodiment of a graphical user interface for display on an electronic device in accordance with the present invention.

Referring again to FIG. 1 and to FIG. 16, one or more graphical indicators can be displayed on electronic device 100 to graphically communicate, or display, firearm user input. At least two types of firearm user input can be graphically displayed on electronic device 100. First, electronic device 100 can provide a graphical display, or a graphical user interface 90, showing the trigger position indicator, or trigger position indicator 108. Trigger position indicator 108 generally includes a line representative of the trigger pull path, or trigger displacement, along at least two axes. For example, trigger 20 can be pulled along first axis 15 and second axis 17 during a trigger pull. Trigger position indicator 108 can be displayed graphically to scale on screen 101. For example, a trigger displacement of one micron can be graphically displayed as a one millimeter or larger line on screen 101. A scale ratio of actual trigger displacement to trigger position indicator length as displayed on screen 101 of between about 1:1 and about 1:1000 is used in some embodiments of firearm system 10.

As seen in FIG. 16, graphical user interface 90 can be displayed on screen 101 of electronic device 100. Graphical user interface 90 displays a trigger position indicator 108 represented as a line. In some embodiments, trigger position indicator 108 includes a single line beginning at a zero position 114 and moving away from the zero position 114. Trigger position indicator 108 moves relative to a center line 109 so that a user can visually detect the lateral movement of the trigger. Center line 109 represents the longitudinal barrel axis 15 in some embodiments.

Also seen in FIG. 16, one or more boundary lines 112a, 112b are displayed on graphical user interface 90 in some embodiments. Boundary lines 112a, 112b represent an acceptable range of lateral trigger movement. When trigger position indicator 108 is entirely within boundary lines 112a, 112b, a successful trigger pull can be indicated by a first audio or visual indicator. However, if the trigger position indicator 108 extends outside first or second boundary lines 112a, 112b, an unsuccessful trigger pull can be indicated by a second audio or visual indicator, wherein the first and second audio or visual indicators are different. First and second boundary lines 112a, 112b can be adjusted to represent different trigger pull skill levels. For example, when distance 115 between boundary lines is decreased, the difficulty of performing a successful trigger pull is increased. Multiple virtual skill levels can be programmed on electronic device 100 or on firearm body 11 for providing skill levels of varying difficulty. In one embodiment, a virtual skill level control having a first skill level control 113a and a second skill level control 113b is included on graphical user interface 90. First skill level control 113a includes a virtual control for increasing skill level, i.e. for moving boundary lines 112a, 112b closer together. Similarly, second skill level control 113b includes a virtual control for decreasing skill level, i.e. for moving boundary lines 112a, 112b farther apart.

Figure 4:
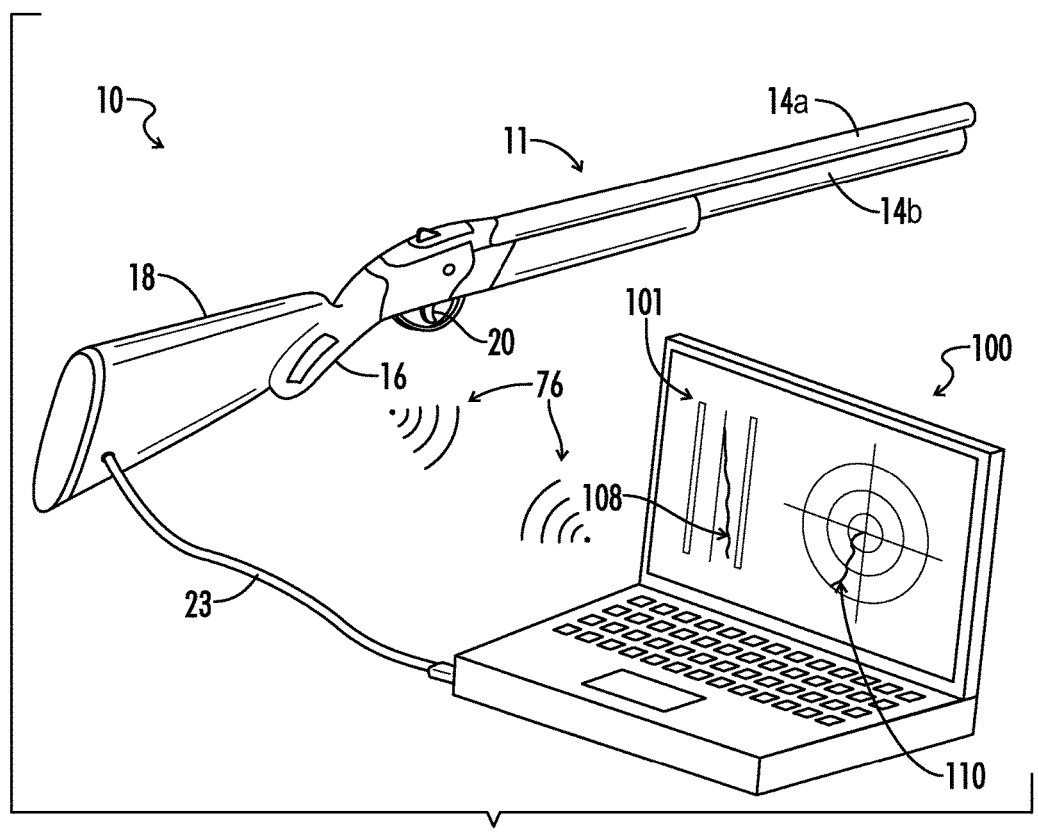
FIG. 4 illustrates a perspective view of an embodiment of a firearm system including a firearm body in the form of a shotgun and an electronic device in communication with the firearm body.

Electronic device 100 can in some embodiments display the trigger position indicator 108 in real time during the trigger pull. For example, the firearm system 10 can be in communication with electronic device 100 during the trigger pull so that a communication signal including trigger position information is communicated to electronic device 100 during the trigger pull. The communication signal generally includes the longitudinal and lateral position coordinates of the trigger and/or scaled data associated with the position coordinates. Alternately, the communication signal can include information that can be used to calculate the longitudinal and lateral position coordinates of the trigger. In one embodiment, the communication signal is transmitted to the electronic device 100 by a wired connection via a cable 23, as seen in FIG. 4. In other embodiments, the communication signal is transmitted to the electronic device using a wireless connection. In other embodiments trigger position indicator 108 is displayed in semi-real time following one or more update delays in the communication signal transmitted between firearm body 11 and electronic device 100. For example, communication signal may be transmitted in periodic bursts, creating a lag between the movement of the trigger and the graphical display of trigger position indicator 108.

As noted above, the trigger pull path can influence the position of the firearm barrel 14 relative to a target. When the trigger pull path 108 includes a lateral displacement component, the firearm body 11 can move up or down or from side to side, thereby moving barrel 11 and influencing the trajectory of the bullet or projectile(s) at the moment the shot is fired. The motion of the barrel 14 is generally measured along at least two axes. First, the barrel can move along the lateral axis discussed above. Second, the barrel can move generally up and down along a vertical axis 19, seen in FIG. 1. The movement of barrel 14 along the lateral and vertical axes can influence the shot trajectory. Thus, it is important for a firearm user to monitor the barrel displacement path during the trigger pull. By monitoring the effect a trigger pull has on the barrel displacement, a user of the firearm apparatus 10 of the present invention can train to improve trigger pull technique to minimize barrel displacement.

As seen further in FIG. 1 and FIG. 16, in some embodiments a barrel displacement indicator 110 can also be displayed on graphical user interface 90, displayed on screen 101 of electronic device 100. Barrel displacement indicator 110 graphically indicates movement of the firearm body 11, and particularly barrel 14, experienced during the trigger pull. For example, a trigger pull that includes a lateral displacement component can cause a corresponding movement of the firearm body 11. Barrel displacement indicator 110 provides a graphical representation of the direction and the magnitude of the movement of firearm body 11. Barrel displacement indicator 110 can be illustrated as a line beginning at a barrel zero position 116 and extending outward along at least two axes 17, 19. Barrel displacement indicator 110 indicates lateral movement along second axis 17 and vertical movement along third axis 19. The movement of firearm body 11, and particularly barrel 14, represented by barrel displacement indicator 110 can be due to linear motion along one or more axes, angular rotation about one or more axes, or a superposition of both linear motion and angular rotation about one or more axes. By monitoring the barrel displacement during the trigger pull, a user can detect the amount of inadvertent barrel movement that results from a pull of the trigger.

Also seen in FIG. 16, a numeric barrel displacement indicator 111 can be included on graphical user interface 90. Numeric barrel displacement indicator 111 indicates the distance the barrel has moved off the barrel zero position 117 during the trigger pull. Generally, the barrel position indicator 110 begins at the origin, or barrel zero position 116, when a trigger pull is initiated. Movement of the firearm body 11 is detected throughout the trigger pull and the movement is graphically displayed as barrel indicator 110. When the trigger pull is complete, the barrel displacement indicator 110 stops at a final barrel displacement position 117. Numeric barrel displacement indicator 111 indicates the distance between the final barrel displacement position 117 and the barrel zero position 116. Numeric barrel displacement indicator 111 can be programmed to display the numeric distance a projectile fired from the firearm body 11 will move off the zero barrel position 116 following a trigger pull. Numeric barrel displacement indicator 111 in some embodiments can indicate barrel displacement data scaled to correspond to various shot parameters, including target distance.

Figure 3A:
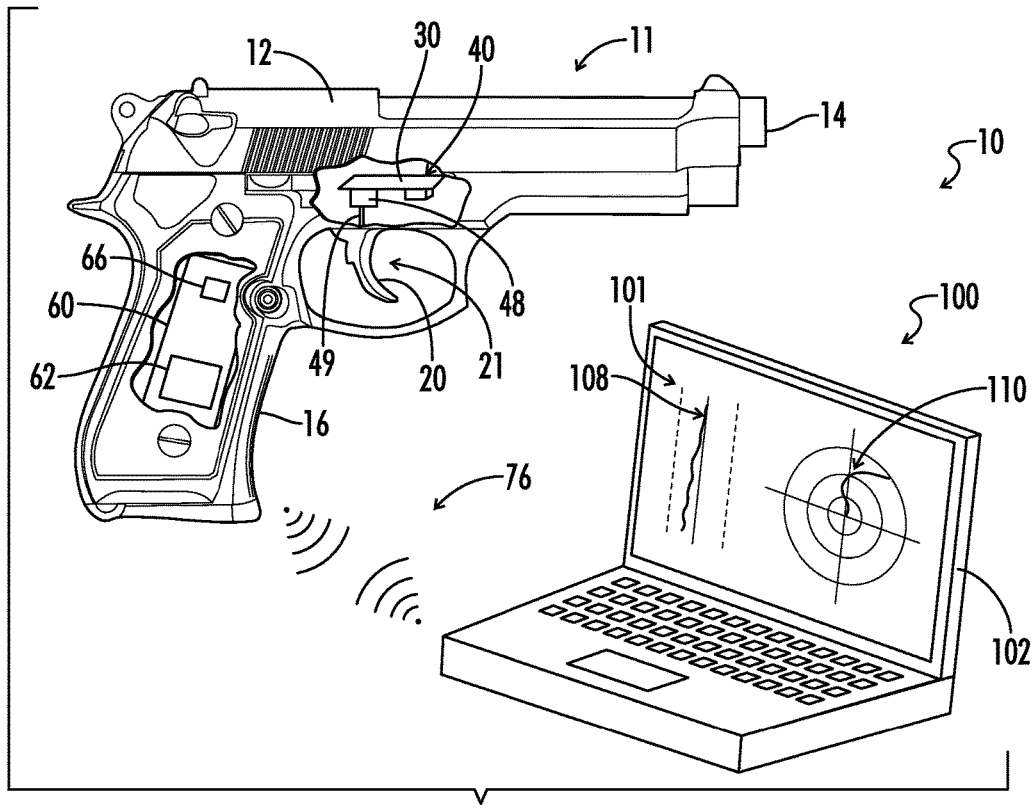
FIG. 3A illustrates a perspective view of an embodiment of a firearm system including a firearm body in the form of a handgun and an electronic device in wireless communication with the firearm body.
Figure 3B:
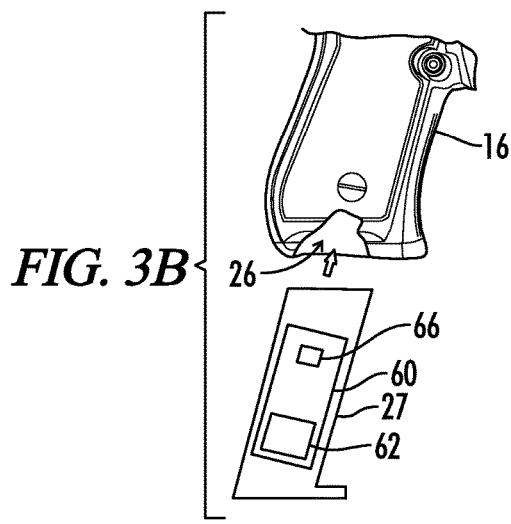
FIG. 3B illustrates a partially broken away exploded view of an embodiment of a handle of a firearm body.

Referring now to FIG. 3A, in some embodiments, firearm apparatus 10 includes a firearm body 11 having the shape of a pistol, or a handgun. Firearm body 11 can include a semi-automatic handgun, a revolver, or another type of handgun or handgun replica known in the art. Firearm body 11 in this embodiment generally includes a handle 16 adapted for being gripped by a user's hand. A trigger 20 is attached to firearm body 11 generally extending toward handle 16. In some embodiments, the trigger 20 is shaped for being engaged by only one finger of a user's hand when the user's hand is positioned on handle 16. Trigger 20 generally includes a curved, or concave, region 21. A first circuit board 30 is disposed inside receiver 12 on firearm body 11. First circuit board 30 generally includes a position input circuit including a multi-axis position controller 48. In some embodiments, multiple single-axis position controllers can substitute a single multi-axis position controller 48. Position controller 48 includes a post 49 extending downward away from the first circuit board 30. Trigger 20 is mechanically attached to post 49 so that when trigger 20 is pulled toward handle 16, post 49 is moved toward handle 16 and a trigger position signal is generated by position controller 48. As seen in FIG. 3A, a firearm body 11 having a handgun shape is in communication with electronic device 100 via a wireless communication signal 76 in some embodiments. Trigger position indicator 108 can be graphically displayed on electronic device 100 and corresponds to the displacement of trigger 20 during the trigger pull. A barrel displacement indicator 110 is also displayed on electronic device 100 and corresponds to the displacement of barrel 14 during the trigger pull. As seen in FIG. 3B, in some embodiments, handle 16 defines a handle cavity 26. A removable insert 27 can be inserted into handle cavity 26. In some embodiments, a second circuit board 60 is positioned on removable insert 27. Removable insert 27 can be inserted into handle 16 on firearm body 11 in some embodiments. In some embodiments, removable insert 27 is interchangeable with an ammunition magazine, or clip, for insertion into handgun cavity 26.

Referring now to FIG. 4, in some embodiments, firearm system 10 includes a firearm body 11 forming a shotgun or a replica of a shotgun. Firearm body 11 generally includes a barrel 14 and a handle 16. Barrel 14 in some embodiments can include a first barrel 14a and a second barrel 14b. A shoulder stock, or butt stock 18, is also attached to firearm body 11. In some embodiments, the firearm body 11 can include an over-and-under shotgun, a side-by-side shotgun, a single shot shotgun, a pump shotgun or a semi-automatic shotgun. The shotgun of FIG. 4 can communicate with an electronic device 100 by a communication signal 76. In some embodiments, communication signal is a bidirectional wireless data signal. In other embodiments, a communication wire 23 can be connected to firearm body 11 and also to electronic device 100 for providing a path for transmission of communication signal 76.

Figure 5:
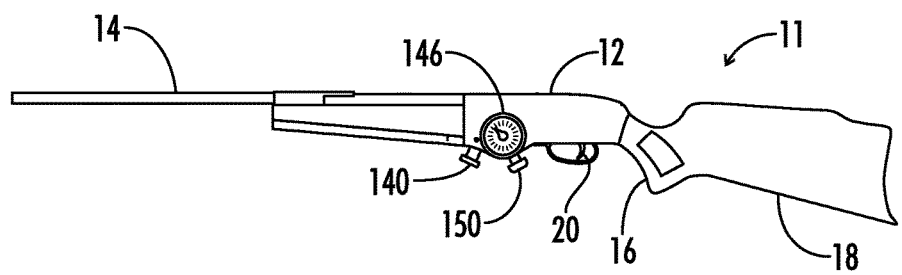
FIG. 5 illustrates a side elevation view of an embodiment of a firearm body.

Referring now to FIG. 5, in some embodiments a firearm body 11 includes an adjustable trigger 20. Trigger 20 in one embodiment includes a mechanism for adjusting the trigger pull force, or the amount of force required to fully depress trigger 20. In different applications, different types of firearms can include triggers having different trigger pull force characteristics. For example, a long-range hunting rifle may have a trigger that requires a relatively small amount of longitudinal force to actuate the trigger and to fire a round. In contrast, a shotgun or handgun for use in some applications can include a trigger that has a relatively larger trigger pull force requirement. Additionally, different firearm operators may prefer different trigger pull force settings. In some embodiments, the present invention provides a firearm body 11 that includes an adjustable trigger pull force. In one embodiment, seen in FIG. 6, a tensioner knob 24 extends from receiver 12. Tensioner knob 24 can be rotated to adjust the tension applied to trigger 20. In one embodiment, seen in FIG. 5 and FIG. 6, a trigger tension indicator 146 is disposed on firearm body 11. Trigger tension indicator 146 generally indicates the current tension setting to the user of firearm body 11. When the tensioner knob 24 is turned in a first direction, the trigger tension can be reduced, and when the tensioner knob 24 is turned in the opposite direct, the trigger tension can be increased.

Figure 7:
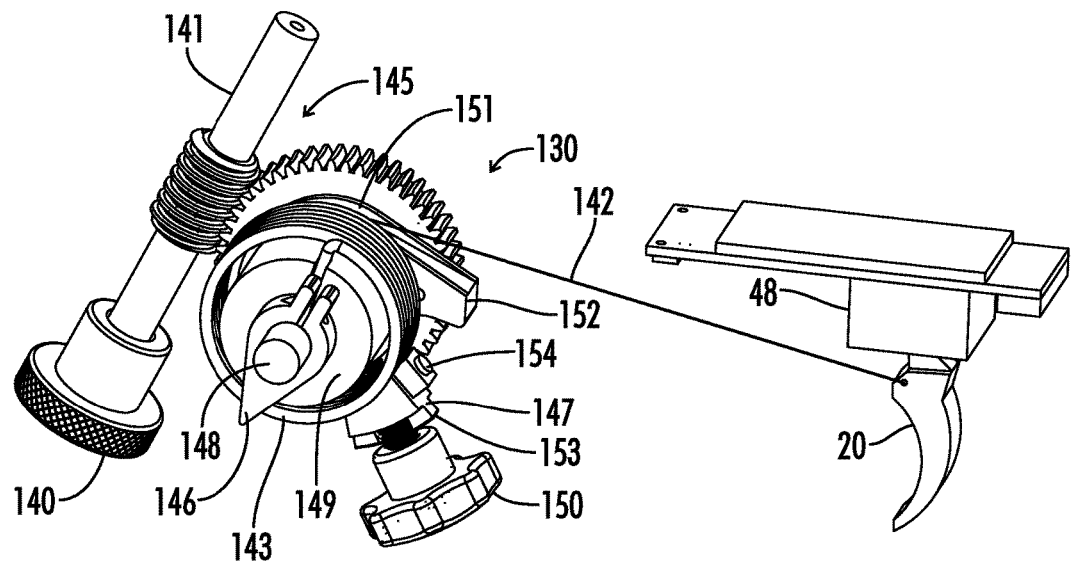
FIG. 7 illustrates a partially broken away detail view of an embodiment of a firearm body showing a trigger tensioner assembly.

Referring now to FIG. 7, a trigger tensioner assembly 130 is disposed in firearm body 11 in some embodiments. Trigger tensioner assembly 130 includes a shaft 148 and a means for rotating the shaft. In some embodiments, the means for rotating the shaft is a worm gear 145. The worm gear 145 includes worm gear shaft 145 with a worm drive that can be rotated using a tensioner knob 140. When worm gear shaft 141 is rotated, worm drive engages worm gear 145 and causes shaft 148 to rotate. A spring mandrel 149 is attached to shaft 148. In some embodiments, spring mandrel 149 is attached to worm gear 145. Spring mandrel 149 includes a torsion spring 143 disposed around spring mandrel 149. Torsion spring 143 can include one or more turns of a resilient wire-shaped material around the spring mandrel 149. In some embodiments, a first end of torsion spring 143 is rigidly attached, or fixed, to the spring mandrel 149. The second end of torsion spring 143 can be attached to a pulley 151 rotatably disposed about spring mandrel 149. In some embodiments, pulley 151 is pivotally attached to shaft 148. Pulley 151 can generally rotate relative to shaft 148 and/or spring mandrel 149. When pulley 151 is attached to spring 143, pulley 151 is biased toward a first angular position such that when pulley 151 is forcibly rotated to a second angular position, the torsion spring 143 acts to apply a force on pulley 151 oriented toward the first angular position.

Figure 8:
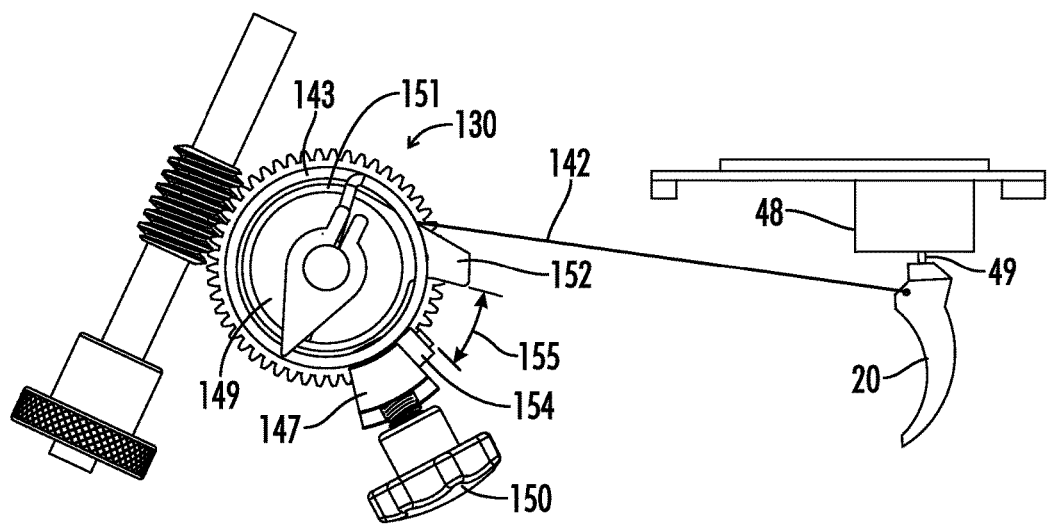
FIG. 8 illustrates a partially broken away detail view of an embodiment of a firearm body showing a trigger tensioner assembly.

The tensioner assembly 130 includes a tensioner cable 142, as seen in FIG. 7 and FIG. 8. Tensioner cable 142 can include a pliable cable comprising a metal or plastic material or any other material suitable for withstanding tension known in the art. In some embodiments, tensioner cable 142 can include a rigid or semi-rigid member extending wholly or partially between trigger 20 and pulley 151. As seen in FIG. 7, cable 142 extends from trigger 20 to pulley 151. In some embodiments, pulley 151 can extend from post 49 to pulley 151. In some embodiments, when trigger 20 is at a resting, or zero position, a tension preload is applied to pulley 151 by spring 143, causing cable 142 to remain under a tensile load when trigger 20 is not actuated. In other embodiments, when trigger 20 is at a resting, or zero position, no tension preload is applied to pulley 151 by spring 143. When tensioner knob 140 is rotated, the tension applied to cable 142 is increased or decreased by changing the tension in spring 143.

Referring further to FIG. 7 and FIG. 8, pulley 151 can include a pulley flange 152 protruding from pulley 151. Pulley flange 152 can extend toward trigger 20 in some embodiments. In other embodiments, pulley flange 152 extends from any other angular position on pulley 151. When trigger 20 is pulled generally away from tensioner assembly 130, pulley 151 rotates about spring mandrel 149 and/or shaft 148. As pulley 151 rotates, an angular force acts on pulley 151 provided by spring 143 generally opposing the direction of pulley rotation. During pulley rotation, pulley flange 152 also rotates.

Figure 6:
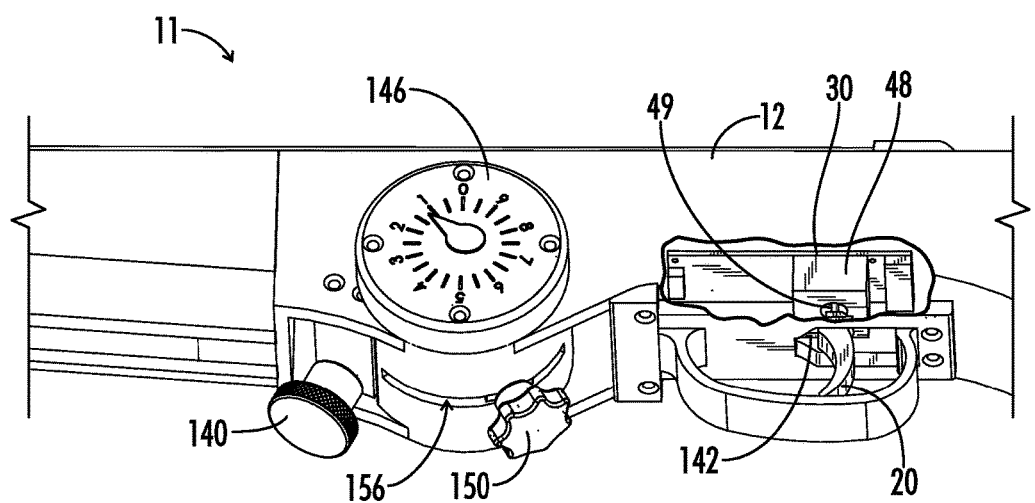
FIG. 6 illustrates a bottom perspective view of an embodiment of a firearm body.

As seen in FIG. 6, a creep adjustment knob 150 extends from firearm body 11 in some embodiments. Creep adjustment knob 150 can generally be selectively moved to adjust the trigger creep. Trigger creep is defined as the longitudinal distance the trigger is pulled before a firing mechanism is actuated inside firearm body 11 for firing a shot. When the trigger is pulled a predetermined distance, an event is initiated. The event can include the firing of a shot, or the beginning or end of data acquisition. By allowing adjustable trigger creep, firearm body 11 of firearm system 10 can provide a user the ability to simulate different types of firearms having various trigger creep characteristics for use in various shooting situations. Creep adjustment knob 150 in one embodiment, seen in FIG. 8, is attached to a trigger stop, or creep adjustment block 147. Trigger stop 147 can generally be angularly or radially positioned relative to tensioner assembly 130. In some embodiments, trigger stop 147 is attached to tensioner assembly 130. In other embodiments, trigger stop 147 is attached to firearm body and is generally moveable along creep slot 156 to adjust the amount of trigger creep. For example, when creep adjustment knob 150 is loosened, trigger stop 147 can be angularly repositioned along creep slot 156, thereby changing the trigger creep setting. Creep adjustment knob 150 can be tightened at the desired trigger creep setting, fixing trigger stop 147 in place by pulling trigger stop 147 toward creep adjustment knob 150.

Referring further to FIG. 8, in some embodiments trigger pull length, or trigger creep, is determined by the free angular rotation distance 155 between pulley flange 152 and trigger stop 147. As trigger 20 is pulled, pulley 151 and pulley flange 152 rotate toward trigger stop 147. Eventually, pulley flange 152 engages trigger stop 147 and the end of the trigger pull is reached, i.e. the trigger can be pulled no farther along the longitudinal axis. In some embodiments, a stop switch 154 is positioned on trigger stop 147. Stop switch 154 can include an electronic push-button or plunger style switch suitable for sending a signal to the electronics on firearm body 11 to indicate the end of the trigger pull has been reached. In other embodiments, stop switch 154 can include an optical switch such as a laser, a photodetector, or any other type of optical switch suitable for generating an output signal. When stop switch 154 is actuated, the electronics on firearm body 11 can generally perform a predetermined task. For example, in some embodiments, firearm body 11 can be used in a first mode wherein the trigger pull path indicator and/or barrel displacement indicators will not be displayed until the stop switch 154 is actuated. Similarly, in some embodiments, the information associated with a trigger pull will not be stored until the stop switch 154 is actuated.

Firearm apparatus 10 generally includes a position input circuit including at least one position sensor, or position controller, operative for sensing the displacement of trigger 20 during a trigger pull along one or more axes. Typically, a trigger pull includes at least two position displacement vectors. First, trigger 20 is pulled along a first, or primary, axis. In some embodiments, the first axis is parallel to longitudinal barrel axis 15. It is understood that in some embodiments the first axis may be misaligned with the longitudinal barrel axis 15, and the primary trigger pull direction is not aligned with the longitudinal barrel axis 15. Second, a trigger 20 may be inadvertently moved laterally along a second axis oriented substantially perpendicular to the first axis during a trigger pull. The longitudinal and lateral displacement paths along at least the first and second axes form a trigger pull path.

Referring again to FIG. 3A, in some embodiments a firearm body 11 includes a position input circuit 40 including a multi-axis position controller 48 mechanically attached to trigger 20. In some embodiments, the multi-axis position controller is a dual-axis joystick controller. Multi-axis position controller 48 in an exemplary embodiment is a two-axis ministick controller of model 252A103B60NA-ND manufactured by CTS Corporation of Elkhart, Ind. In some embodiments, position input circuit 40 is disposed on a first printed circuit board 30 positioned in receiver 12 generally above trigger 20. The multi-axis position controller 48 in some embodiments provides a post 49 protruding toward trigger 20, and trigger 20 is mechanically attached to post 49. Multi-axis position controller 48 in some embodiments includes one or more variable resistors that engage in sliding contact with one or more contact pads attached to post 49. When post 49 is translated along one or more axes, the resistance of the one or more variable resistors is changed. A corresponding voltage measured across each variable resistor will also change, and displacement can be determined by correlating a measured change in voltage to a change in position of post 49.

Figure 9A:
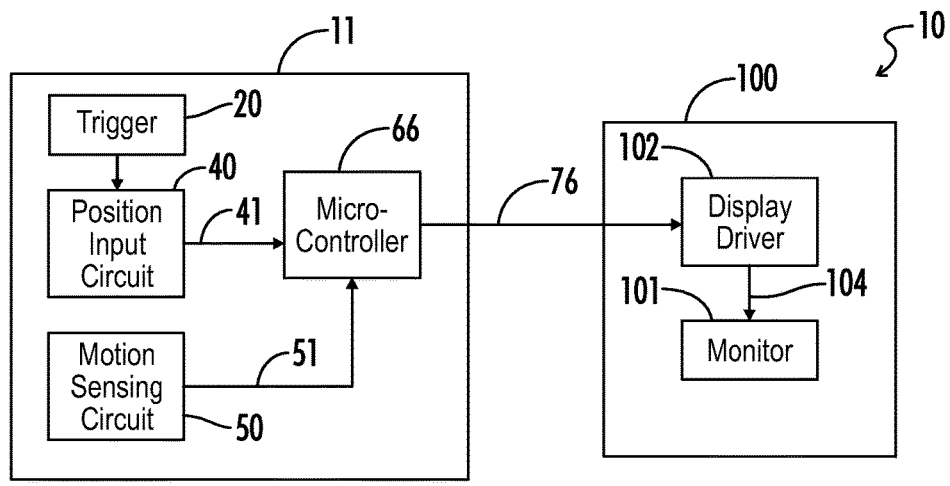
FIG. 9A illustrates an embodiment of a firearm system showing a wired communication signal path between a firearm body and an electronic device.

Referring now to FIG. 9A, in some embodiments position input circuit 40 is disposed on firearm body 11. Position input circuit 40 generally emits a trigger position signal 41 representative of trigger position. Trigger position signal 41 can include one or more analog voltage output signals or digital output signals. Trigger position signal 41 can be sent to a microprocessor, or microcontroller 66. In some embodiments, microcontroller 66 includes a programmable microcontroller, for example a model of the PIC24FJXXXGA1/GB1 family of microcontroller devices manufactured by Microchip Technology Inc. of Chandler, Ariz. In one embodiment, microcontroller 66 includes a model PIC24FJ256GA106-I/PT 16-bit microcontroller manufactured by Microchip Technology, Inc. of Chandler, Ariz. It is understood that other microcontroller devices produced by various manufacturers can also be used in accordance with the present invention.

Figure 10A:
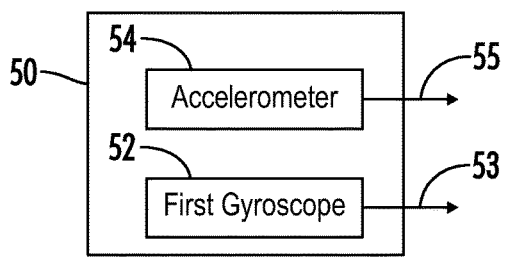
FIG. 10A illustrates an embodiment of a motion sensing circuit for use in a firearm body in accordance with the present invention.

Referring further to FIG. 9A, a motion sensing circuit 50 is also disposed on firearm body 11 in some embodiments. Motion sensing circuit 50 emits a firearm motion signal 51 representative of movement of firearm body 11. Firearm motion signal 51 is generally sent to microprocessor 66. Firearm motion signal 51 generally includes information related to the linear and/or rotational motion of firearm body 11 before, during or after the trigger pull, and can be conditioned using a signal conditioning circuit prior to being sent to microprocessor 66 in some embodiments. Firearm motion signal 51 can include an analog voltage signal or a digital signal. Motion sensing circuit 50 is generally configured for detecting and communicating motion of the firearm body 11 relative to a fixed reference frame such as a gravitational vector. In one embodiment, seen in FIG. 10A, motion sensing circuit 50 includes an accelerometer 54 and a first gyroscope 52. Accelerometer 54 generally emits an accelerometer signal 55 representative of linear motion of firearm body 11, and first gyroscope 52 generally emits a first rotational motion signal, or first gyroscope signal 53, representative of rotational motion of firearm body about at least one axis.

Accelerometer 54 is generally adapted to detect linear motion of firearm body 11 along at least one axis. For example, during a trigger pull, a user might inadvertently move, or jerk, the firearm body 11 along first axis 15, second axis 17 or third axis 19, thereby causing barrel 14 to move and affecting the trajectory of a fired shot. By measuring such linear movement of firearm body 11 along at least one axis, a user can monitor barrel movement. In some instances, such linear movement can be associated with an improper trigger pull. Accelerometer 54 can be a single-axis accelerometer adapted for detecting motion in only one linear direction, a dual-axis accelerometer adapted for detecting motion in two linear directions, or a three-axis accelerometer adapted for detecting motion in three linear directions. In one embodiment, accelerometer 54 includes a model LIS352AX MEM inertial sensor three-axis absolute analog-output accelerometer manufactured by STMicroelectronics of Geneva, Switzerland. Accelerometer 54 emits an accelerometer signal 55, or linear motion signal 55. Linear motion signal 55 includes a signal corresponding to linear movement of firearm body along at least one axis. In some embodiments, linear motion signal can sent to a signal conditioner for improving the quality of the linear motion signal 55. For example, an operational amplifier circuit 56 can be used as a signal conditioner for conditioning linear motion signal 55, as seen in one embodiment in FIG. 11. A conditioned linear motion signal 58 can be emitted from the operational amplifier circuit 56 to a microprocessor 66 in some embodiments. Conditioned linear motion signal 58 can be amplified or filtered to remove noise, and can generally include one or more analog voltage signals.

Figure 10B:
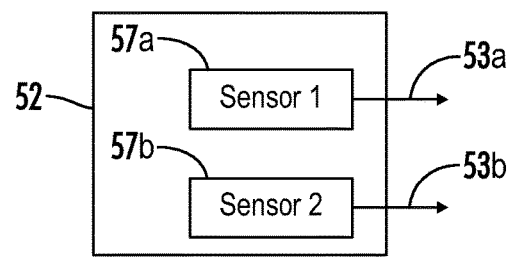
FIG. 10B illustrates an embodiment of a gyroscope for use in a motion sensing circuit of and embodiment of a firearm body in accordance with the present invention.

First gyroscope 52 is generally operable to detect rotational motion of firearm body 11 about at least one axis. For example, during a trigger pull, a user might inadvertently move, or jerk, the firearm body 11 in a rotational motion about one or more axes including first axis, 15, second axis 17 and/or third axis 19. Such rotational movement of firearm body 11 around any one or more axes can cause barrel 14 to move, thereby affecting the trajectory of a fired shot. In some embodiments, first gyroscope 52 can include a micro-electromechanical system (MEMS) and can include more than one gyroscope sensor included in a single integrated circuit (IC) package. For example, in one embodiment, first gyroscope 52 includes a model IDG-1150 dual-axis gyroscope manufactured by InvenSense, Inc. of Sunnyvale, Calif. First gyroscope 54 includes two gyroscope sensors integrated on a single chip in some embodiments, as seen in FIG. 10B. In one embodiment, first sensor 57a is adapted to measure rotation of firearm body 11 about the second axis 17, and second sensor 57b is generally adapted to measure rotation about the first axis 15. First sensor 57a emits a first sensor signal 53a corresponding to rotation about the second axis 17, and second sensor 57b emits a second sensor signal 53b corresponding to rotation about the first axis 15. First and second sensor signals 53a, 53b form first rotational signal 53 which includes an analog voltage in some embodiments of first gyroscope 54. In other embodiments, first rotational signal 53 includes a digital output signal.

Figure 11:
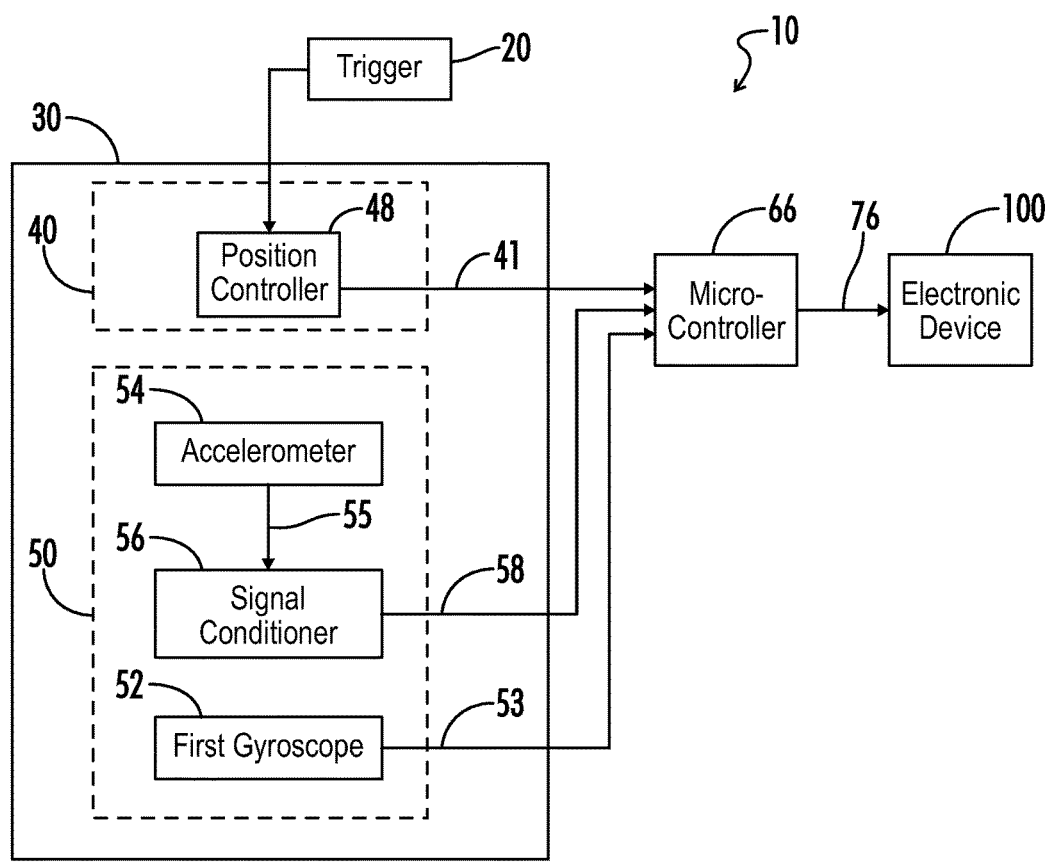
FIG. 11 illustrates an embodiment of a firearm system.
Figure 12:
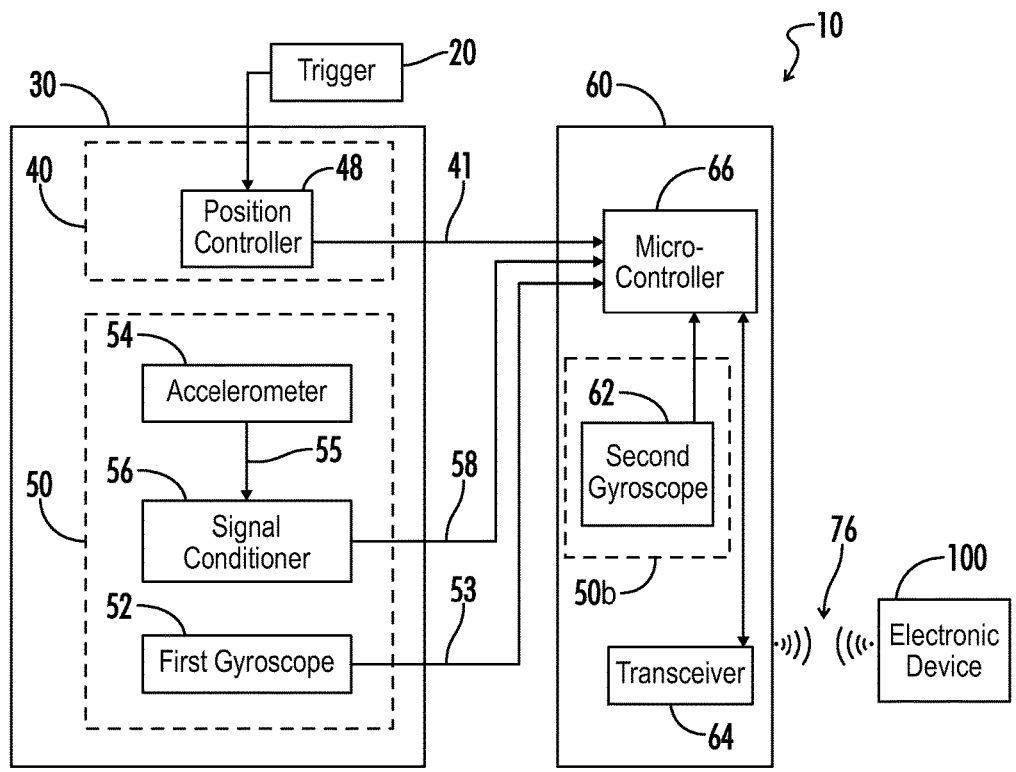
FIG. 12 illustrates an embodiment of a firearm system.

Referring to FIG. 11, in some embodiments, position input circuit 40 and motion sensing circuit 50 are both positioned on first circuit board 30. In some embodiments, microcontroller 66 can also be positioned on first circuit board 30. In yet other embodiments, as seen in FIG. 12, microcontroller 66 is positioned on a second circuit board 60. Second circuit board 60 can be positioned on firearm body 11 at various locations, including receiver 12, stock 18, as illustrated in one embodiment in FIG. 13, or handle 16 as illustrated in one embodiment in FIG. 3A. Additionally, second circuit board 60 can be detachably secured to firearm body 11 on a removable insert, or clip 27 adapted to be inserted into a hollow region 26 defined in handle 16, seen in FIG. 3B.

Figure 9B:
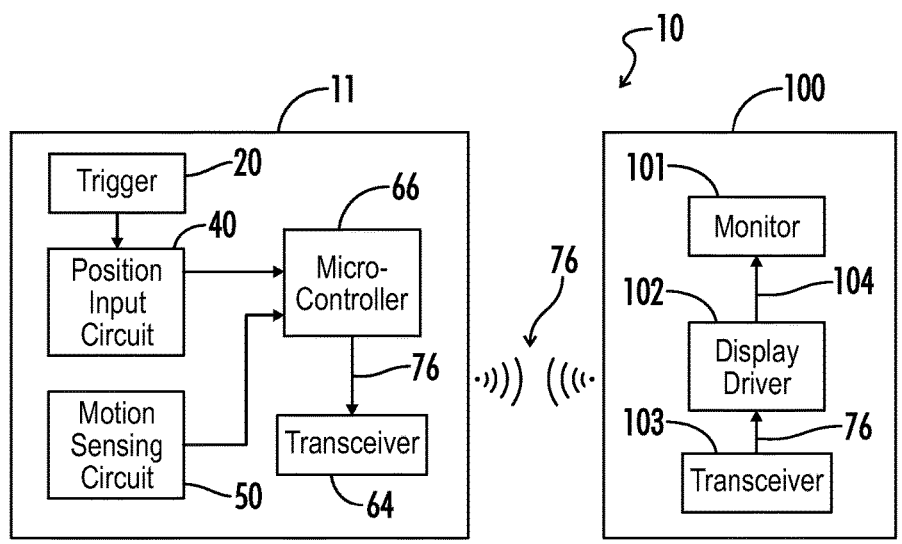
FIG. 9B illustrates an embodiment of a firearm system showing a wireless communication signal path between a firearm body and an electronic device.

Referring again to FIG. 9A, in some embodiments a communication signal 76 is transmitted to electronic device 100. Communication signal 76 can include digital or analog signals including information related to trigger position, linear acceleration of firearm body 11, rotational displacement of firearm body 11, barrel displacement along at least two axes, or other information to be displayed on electronic device 100. Communication signal 76 can include analog output, digital output or both. In some embodiments, communication signal 76 is bidirectional. Communication signal 76 can pass to electronic device 100 via a wired communication signal path, as illustrated in FIG. 9A, or via a wireless communication signal path, as illustrated in FIG. 9B. Wireless signal transmission of communication signal 76 can operate using any type of wireless communication protocol known in the art, such as but not limited to serial or parallel data transmission, TCP/IP communication, radio frequency communication, infrared radiation communication or combinations of these.

Referring to FIG. 9B, in some embodiments firearm body 11 includes a transmitter, or transceiver 64. Transceiver 64 can be positioned on first printed circuit board 30 or on second printed circuit board 60. Additionally, transceiver 64 can be positioned at other locations on firearm body 11. Transceiver 64 in one embodiment includes a radio transmitter for transmitting communication signal 76 to a receiver based on electronic device 100. In some embodiments, transceiver 64 uses a frequency-hopping spread spectrum data transmission protocol, such as Bluetooth, to send data wirelessly to electronic device 100 via wireless communication signal 76. Electronic device 100 includes a corresponding receiver capable of receiving and processing the wireless communication signal 76. In some embodiments, transceiver 64 includes a radio transceiver capable of transmitting and receiving data in the 2.4 GHz industrial, scientific and medical band. Communications circuitry including transceiver 64 can use any suitable communications protocol including Bluetooth, WIFI, 802.11, CDMA, GSM or other cellular or wireless communications protocols. In one embodiment, transceiver 64 includes a model WT11 Class 1 Bluetooth Module manufactured by Bluegiga Technologies of Espoo, Finland. It is understood that other models of transceivers or transmitters operable to use any suitable wireless data transmission protocol may also be attached to firearm body 11 for wirelessly transmitting a communication signal to electronic device 100.

Figure 14A:
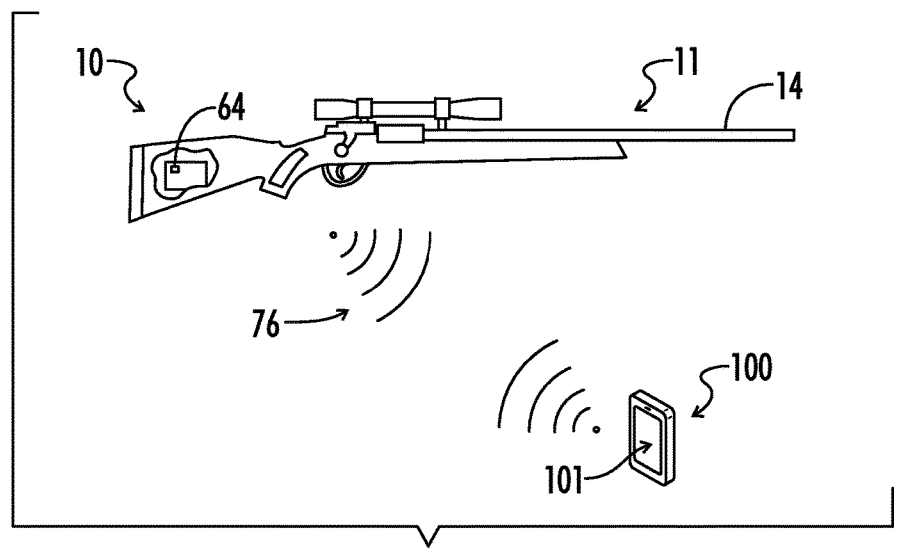
FIG. 14A illustrates an embodiment of a firearm system including a firearm apparatus in wireless communication with a mobile electronic device such as a cellular telephone.
Figure 14B:
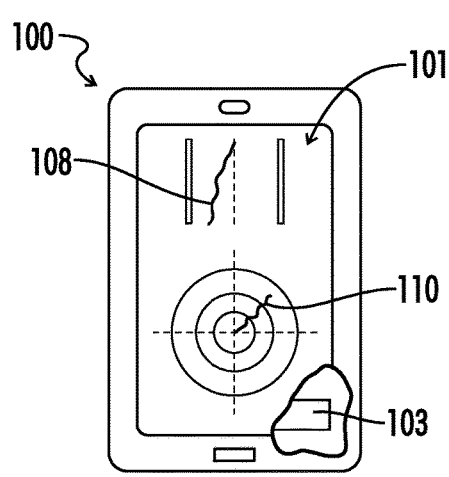
FIG. 14B illustrates an embodiment of a mobile electronic device for use in a firearm system of the present invention.

Referring further to FIG. 9B, because Bluetooth devices, including transmitters, receivers and transceivers, exist in many electronics products, firearm body 11 including a Bluetooth-enabled transceiver 64 can communicate with various devices, including laptop computers, personal digital assistants, mobile cellular handset devices, tablet computers or other Bluetooth-enabled devices. The firearm body 11 includes a Bluetooth transceiver that can be operated in a discoverable mode. When the firearm body 11 is within range of a Bluetooth-enabled host, such as a PC or a mobile cellular handset, a connection is initiated by the host. Communication between the Bluetooth-enabled host, i.e. PC or mobile cellular handset, and the transceiver 64 located on firearm body 11 is bi-directional in some embodiments. Data and status changes are sent from the firearm body 11 to the host. If controls or inputs are manipulated on the host, the changes are sent from the host to the firearm body 11. For example, a user may change software settings on the host to adjust the difficulty level. The changed setting will be transmitted from the host to the firearm body 11 by a bidirectional communication signal 76, as illustrated for example in FIG. 14A.

Firearm body 11 communicates with the host through a virtual serial COM port on the host via the Bluetooth wireless communication protocol in some embodiments. The host can include multiple COM ports, and the proper COM port must be selected for proper data transmission to and from the firearm body 11. In one embodiment, a graphical user interface (GUI), illustrated in FIG. 16 includes a port icon 91 for selection of the proper COM port. The COM port selection information can be stored on the host and will be automatically chosen when the same firearm body 11 is reconnected in a future session.

Referring again to FIG. 13, in some embodiments, second circuit board 60 is housed in stock 18. A battery 24 can also be housed in stock 18 in some embodiments. Battery 24 provides electrical power to circuitry in firearm body 11, including the position input circuit, the motion sensing circuit, and other circuits. In some embodiments, a power switch 22 is positioned on stock 18 for selectively powering the circuitry on firearm body 11. In one embodiment, power switch 22 is a rocker switch. Other types of switches known in the art can be used. In some embodiments, battery 24 is a rechargeable battery, and firearm body 11 includes a recharger plug 25 for connecting an external power source to firearm body 11 for recharging battery 24. In some embodiments, battery 24 can be a removable battery such as a conventional nine volt battery or a type AA, AAA, C, D, etc. or another type battery known in the art.

Figure 13:
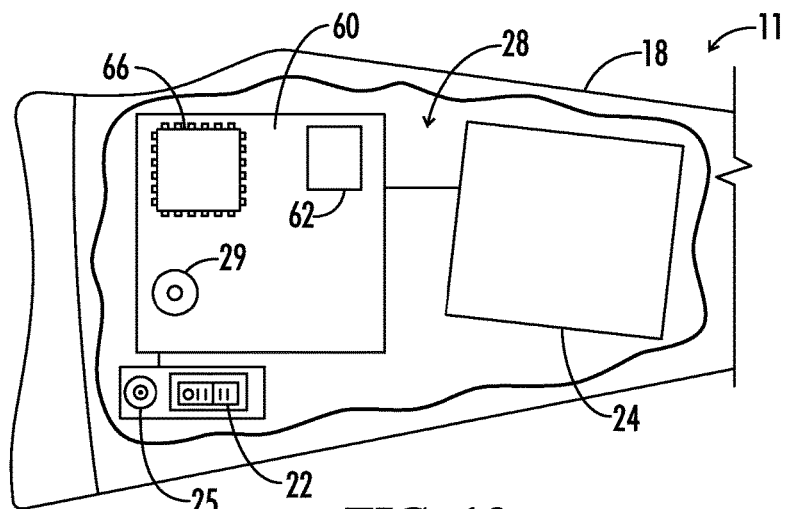
FIG. 13 illustrates a partially broken-away view of an embodiment of a shoulder stock on a firearm body.

Additionally, as seen in FIG. 13, in some embodiments, the firearm body 11 includes a buzzer 29. Buzzer 29 can be configured to be activated to emit an auditory signal detectable by the user when an unsuccessful trigger pull is detected. For example, a user may select a sensitivity level for determining a successful trigger pull defining a maximum allowable lateral displacement boundary in either lateral direction along second axis 17. When the displacement of trigger 20 exceeds the maximum allowable lateral displacement boundary, an auditory signal is emitted by buzzer 29. In some embodiments, the firearm system 10 includes a buzzer control for selectively activating the buzzer feature. For example, a user may want to use the firearm system for monitoring firearm input information in a silent mode, so the buzzer feature can be deactivated using the buzzer control. In some embodiments, buzzer control is a virtual control including a buzzer icon 92 on graphical user interface 90.

Figure 15:
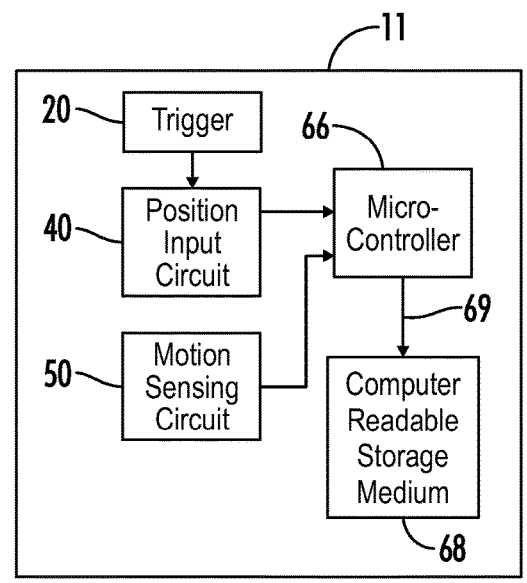
FIG. 15 illustrates an embodiment of a firearm body in accordance with the present disclosure showing a computer readable storage medium.

Referring now to FIG. 15, in some embodiments, firearm body 11 stores data onto a computer readable storage medium 68, such as a flash memory device or the like, as illustrated generally in FIG. 15. In one embodiment, computer readable storage medium 68 includes a removable memory card such as a Secure Digital (SD) format memory card of the type manufactured by SanDisk of Milpitas, Calif. Data associated with one or more trigger pulls and/or barrel displacement data can be stored directly onto the computer readable storage medium 68. Generally, a data write signal 69 is sent from microcontroller 66 to computer readable storage medium 68 either during or following a trigger pull. The computer readable storage medium 68 device can then be removed from firearm body 11 and can be attached to a computer or other electronic device for analyzing or graphically displaying the stored information. Additional information can also be stored on computer readable storage medium 68, including for example trigger pull tension and trigger creep settings, ambient temperature, distance to target or other information. In some embodiments, the computer readable storage medium 68 includes software operable for processing by microprocessor 66.

Referring again to FIG. 9A, in some embodiments electronic device 100 includes a monitor, or screen 101, for graphically displaying or monitoring information associated with firearm user input, i.e. trigger displacement and/or barrel displacement. Screen 101 is attached to firearm body 11, as seen in FIG. 2 in some embodiments. In other embodiments, screen 101 is located on an external electronic device such as a cellular telephone, a television or a computer. As seen in FIG. 9A, a communication signal 76 is sent to electronic device 100. In some embodiments, a display driver 102 processes communication signal 76. Display driver 102 then sends a display signal 104 to monitor, or screen 101. In some embodiments, display driver 102 includes a graphics controller. For example, display driver 102 can include a model SSD1926 graphic controller manufactured by Microchip Technologies, Inc. of Chandler, Ariz. in some embodiments. In some embodiments, screen 101 is a backlit LCD display module adapted to receive display signal 104. Display driver 102 can include a backlight driver for the backlit LCD display module, for example a model LT1937 LED backlight driver such as that manufactured by Linear Technology of Milpitas, Calif.

Figure 17:
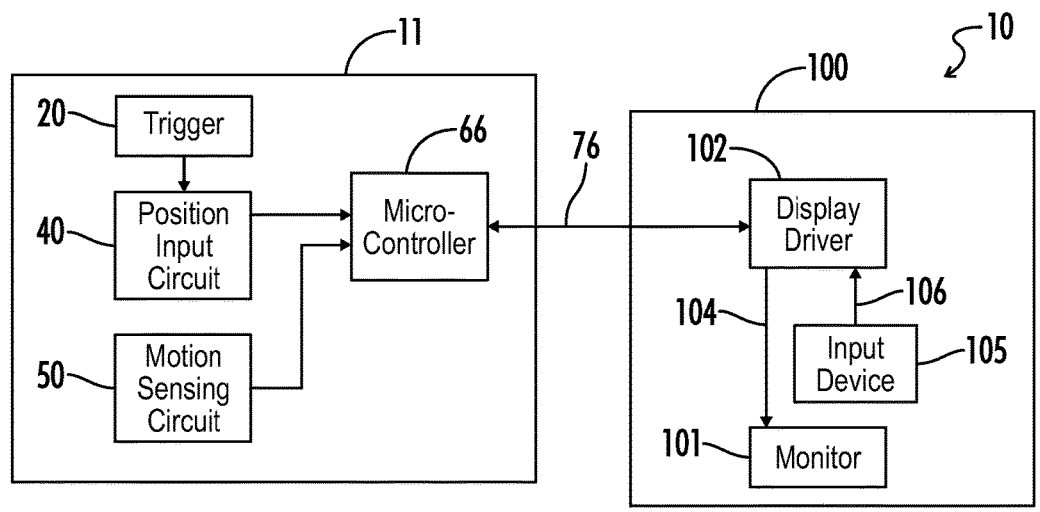
FIG. 17 illustrates an embodiment of a firearm system in accordance with the present invention.

Referring to FIG. 17, in some embodiments, electronic device 100 includes an input device 105. Input device 105 in some embodiments includes a touch screen input device. For example, in some embodiments, input device 105 is an overlay screen positioned on monitor 102. Input device 105 can receive user control input such as skill level, yardage, windage or projectile information such as bullet type, bullet mass, or amount of propellant. In some embodiments, communication signal 76 is a bidirectional signal, and user control input information entered using input device 105 is communicated to firearm body 11. For example, skill level information can be used to control buzzer 29, seen in FIG. 13. Similarly, user control input information can be stored on a computer readable storage medium 68 on firearm body 11, seen in FIG. 15. During use, in some embodiments, firearm system 10 includes the capability to store information associated with one or more trigger pulls. The stored information can be displayed sequentially or simultaneously in graphical or numeric format on display screen 101.

Figure 18:
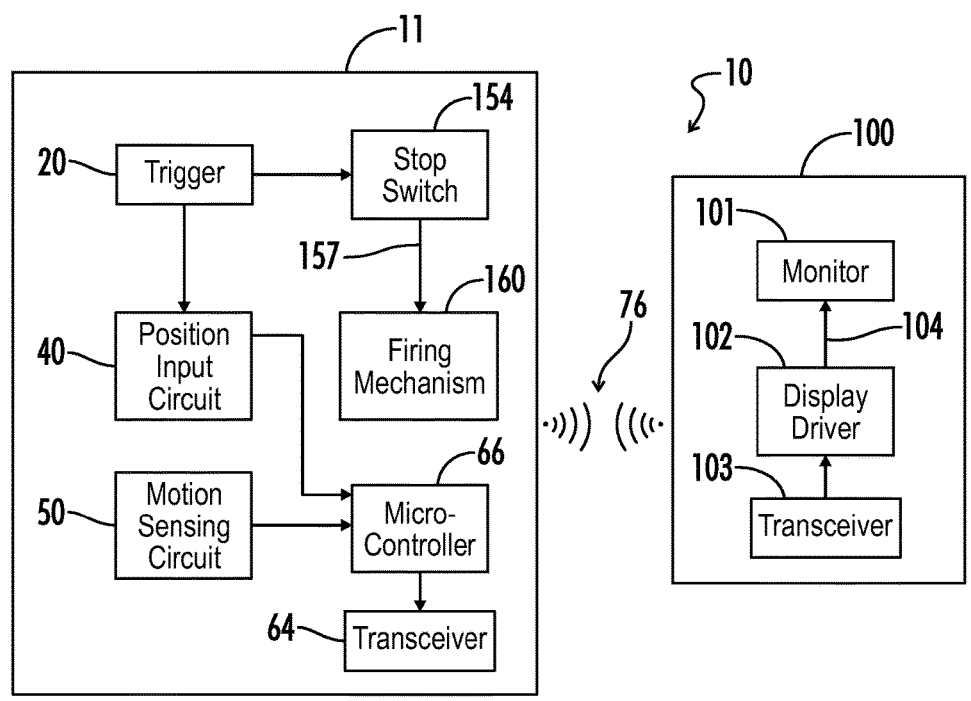
FIG. 18 illustrates an embodiment of a firearm system in accordance with the present invention.

Referring now to FIG. 18, in some embodiments, firearm body 11 includes an electronic firing mechanism 160. Electronic firing mechanism 160 can include an electronic component suitable for controlling a mechanical firing pin. Electronic firing mechanism 160 generally receives an input firing signal 157 from stop switch 154. Input firing signal 157 can include an analog voltage signal or a digital signal. When electronic firing mechanism 160 receives the input firing signal 157, electronic firing mechanism can be actuated to operate the mechanical firing pin, thereby firing a shot of one or more projectiles from firearm body 11. In some embodiments, the trigger position and firearm body movement can be monitored during the trigger pull and/or throughout firing of the shot. By monitoring such information, the user can correlate trigger and/or barrel displacement measured by the circuitry on firearm body 11 to the actual trajectory taken by the fired shot. In some applications, a user can fire a plurality of shots from the firearm and the trigger displacement and barrel displacement information associated with each shot can be stored on a computer readable storage medium for future analysis.

In additional embodiments, the present invention provides a method of providing firearm user input information to a user. The method includes the steps of: (a) providing a firearm including a firearm body and a trigger, a position input circuit including a multi-axis position controller; (b) pulling the trigger; (c) sensing displacement of the trigger along at least two dimensions during the trigger pull; (d) communicating trigger displacement information to a electronic device; (e) displaying on the electronic device a graphical trigger position indicator representation of the trigger pull path along at least two dimensions.

Thus, although there have been described particular embodiments of the present invention of a new and useful Firearm User Input Monitoring System and Methods, it is not intended that such references be construed as limitations upon the scope of this invention except as set forth in the following claims.

What is claimed is:

1. A firearm training system for graphically indicating movement of a firearm body of a firearm during a trigger pull to a user, the system comprising:
a motion sensing circuit disposable on the firearm body, the motion sensing circuit configured to detect movement of the firearm body relative to a fixed reference frame and emit a firearm motion signal representative of the movement of the firearm body;
an electronic device comprising an electronic visual display including a graphical display representative of a physical plane of the firearm body including at least two dimensions along which the firearm body may travel relative to the fixed reference frame; and
a barrel displacement indicator associated with the firearm motion signal graphed on the graphical display, the barrel displacement indicator corresponding to actual movement of the firearm body in the at least two dimensions relative to the fixed reference frame during the trigger pull by the user, wherein the barrel displacement indicator correlates barrel movement with trigger pull and includes a line that extends from a barrel zero position representative of the position of a firearm barrel of the firearm body relative to the fixed reference frame at initiation of the trigger pull, wherein the barrel zero position is set at an origin of at least two axes representative of the at least two dimensions the firearm barrel may move relative to the fixed reference frame during the trigger pull, and wherein the line extends from the barrel zero position to a final barrel displacement position corresponding to the position of the firearm barrel within the at least two dimensions, relative to the barrel zero position, when the trigger pull is complete.

2. The firearm training system of claim 1, wherein the fixed reference frame is a gravitational vector.

3. The firearm training system of claim 1, wherein the firearm motion signal corresponds to linear translation of the firearm body.

4. The firearm training system of claim 1, wherein the firearm motion signal corresponds to rotational motion of the firearm body.

5. The firearm training system of claim 1, wherein the motion sensing circuit comprises at least one accelerometer configured to detect linear motion of the firearm body in at least one linear direction.

6. The firearm training system of claim 5, wherein the at least one accelerometer is a dual-axis accelerometer configured to detect motion of the firearm body in two linear directions.

7. The firearm training system of claim 5, wherein the at least one accelerometer is a three-axis accelerometer configured to detect linear motion in three linear directions.

8. The firearm training system of claim 1, wherein the motion sensing circuit comprises at least one gyroscope configured to detect rotational motion of the firearm body about at least one axis of the firearm body.

9. The firearm training system of claim 8, wherein the at least one gyroscope is a dual-axis gyroscope including a first sensor configured to measure rotation of the firearm body about a first axis, and a second sensor configured to measure rotation of the firearm body about a second axis.

10. The firearm training system of claim 1, wherein the motion sensing circuit comprises at least one accelerometer and at least one gyroscope, the at least one accelerometer configured to detect linear motion of the firearm body along at least one axis of the firearm body, the at least one gyroscope configured to detect rotational motion of the firearm body about at least one axis of the firearm body.

11. The firearm training system of claim 10, wherein the firearm motion signal emitted by the motion sensing circuit includes an accelerometer signal emitted by the at least one accelerometer and a gyroscope signal emitted by the at least one gyroscope, the accelerometer signal representative of the linear motion detected by the at least one accelerometer during the trigger pull by the user, and the gyroscope signal representative of the rotational motion detected by the at least one gyroscope during the trigger pull by the user.

12. The firearm training system of claim 1, further comprising a microprocessor in communication with the motion sensing circuit, wherein the firearm motion signal is input into the microprocessor, the microprocessor communicating the firearm motion signal with the electronic device.

13. The firearm training system of claim 12, further comprising a transceiver in communication with the microprocessor, the transceiver operable to transmit the firearm motion signal wirelessly to the electronic device.

14. The firearm training system of claim 1, wherein the motion sensing circuit is configured to detect movement of the firearm barrel relative to the fixed reference frame and wherein the firearm motion signal emitted by the motion sensing circuit is representative of the movement of the firearm barrel, and wherein the graphical display is representative of a physical plane of the firearm barrel including the at least two dimensions along which the firearm barrel may travel relative to the fixed reference frame.

15. A firearm training system for graphically indicating movement of a firearm body of a firearm during a trigger pull to a user, the system comprising:
  a motion sensing circuit disposable on the firearm body, the motion sensing circuit including at least one accelerometer configured to detect linear motion of a firearm barrel of the firearm body relative to a fixed reference frame and at least one gyroscope configured to detect rotational motion of the firearm barrel relative to the fixed reference frame, the motion sensing circuit configured to emit a firearm motion signal representative of the linear and rotational motion of the firearm barrel;
  an electronic device comprising an electronic visual display including a graphical display representative of a physical plane of the firearm body including at least two dimensions along which the firearm barrel may travel relative to the fixed reference frame; and
  a barrel displacement indicator associated with the firearm motion signal graphed on the graphical display, the barrel displacement indicator corresponding to actual movement of the firearm barrel in the at least two dimensions relative to the fixed reference frame during the trigger pull by the user, wherein the barrel displacement indicator correlates barrel movement with trigger pull and includes a line that extends from a barrel zero position representative of the position of the firearm barrel relative to the fixed reference frame at initiation of the trigger pull, wherein the barrel zero position is set at an origin of at least two axes representative of the at least two dimensions the firearm barrel may move relative to the fixed reference frame during the trigger pull, and wherein the line extends from the barrel zero position to a final barrel displacement position corresponding to the position of the firearm barrel within the at least two dimensions, relative to the barrel zero position, when the trigger pull is complete.

16. The firearm training system of claim 15, wherein:
  the at least one accelerometer is a three-axis accelerometer configured to detect motion in three linear directions; and
  the at least one gyroscope is configured to detect rotational motion of the firearm barrel around at least two axes of the firearm body.

17. The firearm training system of claim 16, wherein the at least one gyroscope is configured to detect rotational motion of the firearm barrel about a lateral axis and a vertical axis of the firearm body.

18. A firearm training system for graphically indicating movement of a firearm body of a firearm during a trigger pull to a user, the system comprising:
  a motion sensing circuit disposable on the firearm body, the motion sensing circuit including at least one accelerometer configured to detect linear motion of the firearm body relative to a fixed reference frame and at least one gyroscope configured to detect rotational motion of the firearm body relative to the fixed reference frame, the motion sensing circuit configured to emit a firearm motion signal representative of the linear and rotational motion of the firearm body relative to the fixed reference frame;
  an electronic device comprising an electronic visual display from which a graphical display is presented with a Cartesian coordinate system having at least two axes representative of a physical plane of the firearm body, the axes of the graphical display representative of at least two dimensions along which the firearm body may travel relative to the fixed reference frame; and
  a barrel displacement indicator associated with the firearm motion signal graphed on the graphical display, the barrel displacement indicator corresponding to actual movement of the firearm body in at least two dimensions relative to the fixed reference frame during the trigger pull by the user, wherein the barrel displacement indicator is displayed on the graphical display as a line beginning at a barrel zero position located at an origin of the Cartesian coordinate system representative of a position of the firearm body at the initiation of the trigger pull, the line extending from the barrel zero position with respect to one or more axes of the graphical display corresponding to the actual movement of the firearm body from the barrel zero position during the trigger pull by the user.

19. The firearm training system of claim 18, wherein at least a portion of the motion sensing circuit is detachably securable to the firearm body.

* * * * *